(12) United States Patent
Turtinen et al.

(10) Patent No.: US 12,520,347 B2
(45) Date of Patent: Jan. 6, 2026

(54) RESTRICTING A RANDOM ACCESS PROCEDURE

(71) Applicant: Nokia Technologies Oy, Espoo (FI)

(72) Inventors: Samuli Turtinen, Oulu (FI); Chunli Wu, Beijing (CN); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 139 days.

(21) Appl. No.: 18/248,256

(22) PCT Filed: Oct. 13, 2020

(86) PCT No.: PCT/CN2020/120653
§ 371 (c)(1),
(2) Date: Apr. 7, 2023

(87) PCT Pub. No.: WO2022/077220
PCT Pub. Date: Apr. 21, 2022

(65) Prior Publication Data
US 2023/0379975 A1    Nov. 23, 2023

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/00
See application file for complete search history.

(56) References Cited

U.S. PATENT DOCUMENTS

| | | | |
|---|---|---|---|
| 9,210,667 B2 | 12/2015 | Dinan | |
| 2013/0322339 A1* | 12/2013 | Ohta | H04L 5/001 370/328 |
| 2016/0007213 A1* | 1/2016 | Cui | H04W 28/0215 370/230 |
| 2018/0139778 A1 | 5/2018 | Chou et al. | |
| 2018/0270869 A1 | 9/2018 | Tsai | |
| 2018/0302914 A1* | 10/2018 | da Silva | H04W 76/27 |
| 2018/0352580 A1 | 12/2018 | Wang et al. | |

(Continued)

FOREIGN PATENT DOCUMENTS

| | | |
|---|---|---|
| CN | 104322132 A | 1/2015 |
| CN | 108476539 A | 8/2018 |

(Continued)

OTHER PUBLICATIONS

Office action received for corresponding Japanese Patent Application No. 2023-522484, dated Jun. 4, 2024, 3 pages of office action and 3 pages of translation available.

(Continued)

*Primary Examiner* — Siren Wei
(74) *Attorney, Agent, or Firm* — Nokia Technologies Oy (57) ABSTRACT

An apparatus, method and computer program product for: initiating a small data transmission procedure, receiving information relating to a restriction to perform a random access procedure during the small data transmission procedure, and restricting the random access procedure based on the information relating to the restriction.

18 Claims, 3 Drawing Sheets

(56) References Cited

U.S. PATENT DOCUMENTS

| | | | | |
|---|---|---|---|---|
| 2021/0076306 A1* | 3/2021 | Tamura | ................ | H04W 48/02 |
| 2021/0274525 A1* | 9/2021 | Wei | ...................... | H04W 76/27 |

FOREIGN PATENT DOCUMENTS

| | | |
|---|---|---|
| CN | 109952747 A | 6/2019 |
| CN | 110036685 A | 7/2019 |
| CN | 111034327 A | 4/2020 |
| WO | 2009/107947 A1 | 9/2009 |
| WO | 2019/028732 A1 | 2/2019 |
| WO | 2020/087280 A1 | 5/2020 |
| WO | 2022/075782 A1 | 4/2022 |
| WO | 2022/083921 A1 | 4/2022 |

OTHER PUBLICATIONS

"RACH based Small data transmission", 3GPP TSG-RAN WG2 Meeting #111 electronic, R2-2006845, Agenda: 8.6.2, ITL, Aug. 17-28, 2020, 2 pages.

Office action received for corresponding Indian Patent Application No. 202347032017, dated Jul. 10, 2024, 7 pages.

Extended European Search Report received for corresponding European Patent Application No. 20957001.9, dated Oct. 11, 2023, 12 pages.

"Details of solution B for small data transmission in RRC Inactive", 3GPP TSG-RAN WG2 #97, R2-1700890, Agenda: 10.2.2.2, Ericsson, Feb. 13-17, 2017, pp. 1-7.

"Procedure of Small Data Transmission", 3GPP TSG-RAN WG2 #111-e, R2-2006836, Agenda: 8.6.2, OPPO, Aug. 2020, 6 pages.

"Work Item on NR smalldata transmissions in Inactive state", 3GPP TSG RAN Meeting #86, RP-193252, Agenda: 9.1.2, ZTE Corporation, Dec. 9-12, 2019, 4 pages.

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"3rd Generation Partnership Project; Technical Specification Group Radio Access Network; NR; Radio Resource Control (RRC) protocol specification (Release 16)", 3GPP TS 36.331, V16.1.0, Jul. 2020, pp. 1-906.

"3rd Generation Partnership Project; Technical Specification Group Services and System Aspects; Feasibility Study on New Services and Markets Technology Enablers; Stage 1 (Release 14)", 3GPP TR 22.891, V14.2.0, Sep. 2016, pp. 1-95.

"RACH based NR small data transmission", 3GPP TSG-RAN WG2 Meeting #111e, R2-2007540, Agenda: 8.6.2, Qualcomm Incorporated, Aug. 17-28, 2020, pp. 1-5.

"Subsequent Transmission of Small data in Inactive", 3GPP TSG-RAN WG2 Meeting #111 electronic, R2-2006830, Agenda: 8.6.2, MediaTek Inc, Aug. 17-28, 2020, pp. 1-5.

International Search Report and Written Opinion received for corresponding Patent Cooperation Treaty Application No. PCT/CN2020/120653, dated Jun. 29, 2021, 9 pages.

"Identification and access restriction for devices with reduced capabilities", 3GPP TSG-RAN WG2 #111-e, R2-2006912, Agenda: 8.12.2.2, Ericsson, Aug. 17-28, 2020, pp. 1-4.

Notice of Allowance received for corresponding Japanese Patent Application No. 2023-522484, dated Oct. 8, 2024, 2 pages of Notice of Allowance and No. page of translation available.

Office Action received for corresponding Chinese Patent Application No. 202080107376.6, dated Mar. 3, 2025, 7 1 pages of Office Action and 5 pages of translation available.

Notice of Allowance received for corresponding China Patent Application No. 202080107376.6, dated Jul. 31, 2025, 5 pages of Notice of Allowance and no pages of translation available.

Office action received for corresponding European Patent Application No. 20957001.9, dated Oct. 27, 2025, 8 pages.

* cited by examiner

RESTRICTING A RANDOM ACCESS PROCEDURE

RELATED APPLICATION

This application claims priority to PCT Application No. PCT/CN2020/120653, filed on Oct. 13, 2020, which is incorporated herein by reference in its entirety.

TECHNICAL FIELD

The present application relates generally to restricting a random access procedure. More specifically, the present application relates to restricting a random access procedure during a small data transmission procedure.

BACKGROUND

Due to the increase in consumed content and complexity of communications networks, different ways to efficiently make use of network resources are studied.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for: initiating a small data transmission procedure, receiving information relating to a restriction to perform a random access procedure during the small data transmission procedure, and restricting the random access procedure based on the information relating to the restriction.

According to a second aspect of the invention, there is provided a method comprising: initiating a small data transmission procedure, receiving information relating to a restriction to perform a random access procedure during the small data transmission procedure, and restricting the random access procedure based on the information relating to the restriction.

According to a third aspect of the invention, there is provided a computer program comprising instructions for causing an apparatus to perform at least the following: initiating a small data transmission procedure, receiving information relating to a restriction to perform a random access procedure during the small data transmission procedure, and restricting the random access procedure based on the information relating to the restriction.

According to a fourth aspect of the invention, there is provided an apparatus comprising at least one processor and at least one memory including computer program code, the at least one memory and the computer program code configured to with the at least one processor, cause the apparatus at least to: initiate a small data transmission procedure, receive information relating to a restriction to perform a random access procedure during the small data transmission procedure, and restrict the random access procedure based on the information relating to the restriction.

According to a fifth aspect of the invention, there is provided a non-transitory computer readable medium comprising program instructions for causing an apparatus to perform at least the following: initiating a small data transmission procedure, receiving information relating to a restriction to perform a random access procedure during the small data transmission procedure, and restricting the random access procedure based on the information relating to the restriction.

According to a sixth aspect of the invention, there is provided a computer readable medium comprising program instructions for causing an apparatus to perform at least the following: initiating a small data transmission procedure, receiving information relating to a restriction to perform a random access procedure during the small data transmission procedure, and restricting the random access procedure based on the information relating to the restriction.

According to a seventh aspect of the invention, there is provided an apparatus comprising means for: receiving an indication of a small data transmission procedure and transmitting, based on the indication, information relating to a restriction to perform a random access procedure during the small data transmission procedure.

According to an eight aspect of the invention, there is provided a method comprising: receiving an indication of a small data transmission procedure and transmitting, based on the indication, information relating to a restriction to perform a random access procedure during the small data transmission procedure.

According to a nineth aspect of the invention, there is provided a computer program comprising instructions for causing an apparatus to perform at least the following: receiving an indication of a small data transmission procedure and transmitting, based on the indication, information relating to a restriction to perform a random access procedure during the small data transmission procedure.

According to a tenth aspect of the invention, there is provided an apparatus comprising at least one processor and at least one memory including computer program code, the at least one memory and the computer program code configured to with the at least one processor, cause the apparatus at least to: receive an indication of a small data transmission procedure and transmit, based on the indication, information relating to a restriction to perform a random access procedure during the small data transmission procedure.

According to an eleventh aspect of the invention, there is provided a non-transitory computer readable medium comprising program instructions for causing an apparatus to perform at least the following: receiving an indication of a small data transmission procedure and transmitting, based on the indication, information relating to a restriction to perform a random access procedure during the small data transmission procedure.

According to a twelfth aspect of the invention, there is provided a computer readable medium comprising program instructions for causing an apparatus to perform at least the following: receiving an indication of a small data transmission procedure and transmitting, based on the indication, information relating to a restriction to perform a random access procedure during the small data transmission procedure.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to restricting a random access procedure of a terminal device during a small data transmission procedure.

According to an example embodiment, an apparatus such as a terminal device is configured to initiate a small data transmission procedure, receive information relating to a restriction to perform a random access procedure during the small data transmission procedure, restrict the random access procedure based on the information relating to the restriction, and enable initiating the random access procedure upon termination of the restriction to perform the random access procedure.

According to another example embodiment, another apparatus such as a radio access network is configured to receive an indication of a small data transmission procedure, transmit, based on the indication, information relating to a restriction to perform a random access procedure during the small data transmission procedure, and configure an uplink grant for the random access procedure concurrently with the small data transmission procedure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
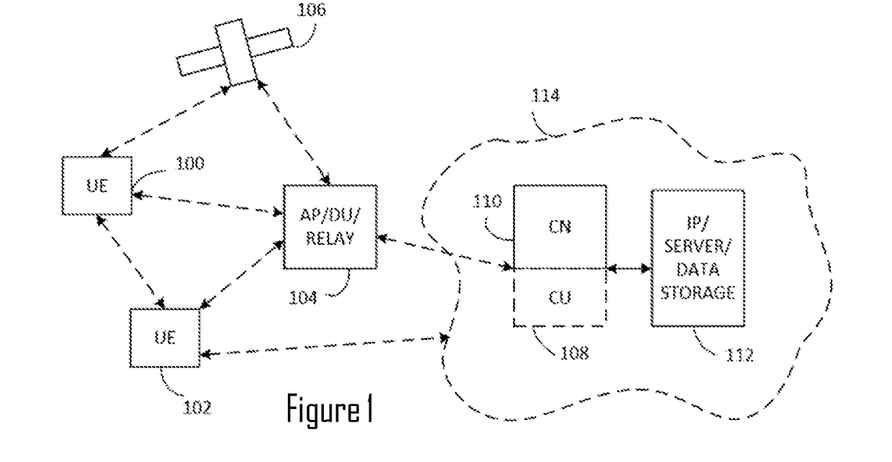
FIG. 1 shows a part of an exemplifying radio access network in which examples of disclosed embodiments may be applied.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As commonly known in connection with wireless communication systems, control or management information is transferred over a radio interface, e.g. between the terminal device 100 and the access node 104.

For communicating with a RAN a terminal device may need to perform a synchronization process with the RAN in order to determine timings for transmission and reception. Synchronization of a terminal device for transmission may be referred to as uplink synchronization and synchronization of the terminal device for reception may be referred to as downlink synchronization.

In other words, uplink synchronization comprises a process in which a terminal device determines an exact timing based on which it may send uplink data. Often a RAN is handling a plurality of terminal devices and the RAN needs to ensure that uplink signals from a plurality of terminal devices are aligned with a common receiver time of the RAN. In some cases, the RAN may need to adjust transmission timings of terminal devices using a radio resource control (RRC) protocol or a medium access control (MAC) protocol. The process of acquiring uplink synchronization may be referred to as a random access (RA) procedure.

There may occur situations where a relatively small amount of data needs to be transmitted from a terminal device to a radio access network (RAN). For example, various Internet-of-Things (IoT) applications may involve exchanging small amounts of data such as metering, alarm and/or notification data.

A terminal device may be configured to perform a small data transmission (SDT) procedure for transmitting a small amount of data. An SDT procedure may comprise transmitting data in an inactive state of the terminal device. For example, an SDT procedure may enable transmitting data without an RRC connection setup process.

However, when an SDT procedure is performed, new data packets may come into the terminal device's buffer and the terminal device may trigger a buffer status report (BSR) and attempts to send the BSR to inform the RAN about the amount of data in an uplink buffer available for transmission to the RAN. If no resources are available for transmitting the BSR and/or the buffered data to the RAN, the BSR may trigger an RA procedure to request uplink resources/grant. This consumes resources and may incur some delay due to the need for the terminal device to evaluate a suitable beam where to attempt the RA procedure.

Figure 2:
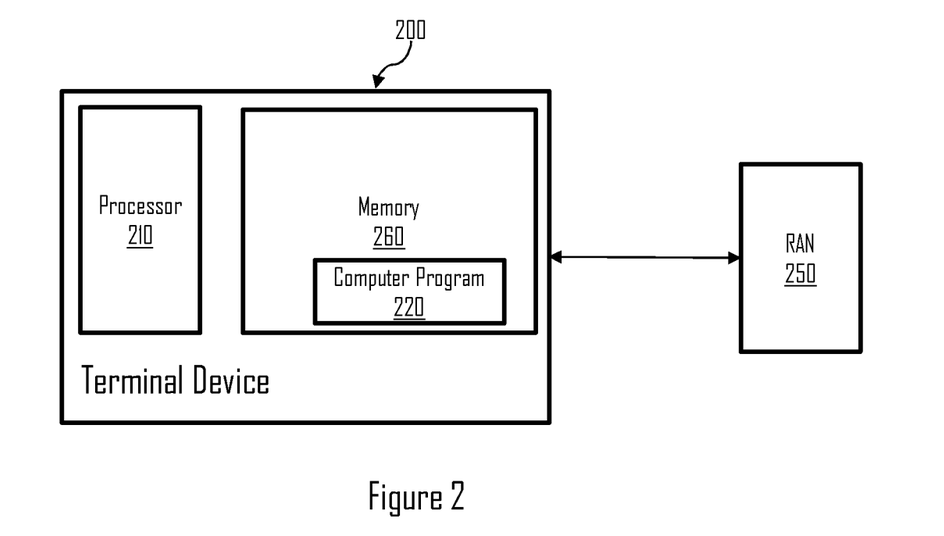
FIG. 2 shows a block diagram of an example apparatus in which examples of the disclosed embodiments may be applied.

The example of FIG. 2 shows an exemplifying apparatus.

FIG. 2 is a block diagram depicting the apparatus 200 operating in accordance with an example embodiment of the invention. The apparatus 200 may be, for example, an electronic device such as a chip, chip-set, radio access network or a terminal device. In the example of FIG. 2, the apparatus 200 is a terminal device configured to communicate with a radio access network (RAN) 250. The apparatus 200 includes a processor 210 and a memory 260. In other examples, the apparatus 200 may comprise multiple processors.

In the example of FIG. 2, the processor 210 is a control unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises a terminal device. For example, the apparatus 200 may comprise user equipment such as a smartphone, a tablet computer or the like.

According to an example embodiment, the apparatus 200 is configured to communicate with an access node such as the RAN 250. Communicating with the RAN 250 may comprise, for example, receiving configuration information from the RAN 250, establishing a communication link with the RAN 250, receiving one or more data packets from the RAN 250, transmitting one or more data packets or requests to the RAN 250, or the like.

Communication between the apparatus 200 and the RAN 250 may need to be organized in a controlled manner. Radio resource control (RRC) is a protocol that comprises functions relating to communication between a terminal device and a RAN. For example, RRC comprises connection establishment and release functions, broadcast of system information (SI), and radio bearer establishment, reconfiguration and release between a terminal device and a RAN.

The operation of the RRC is guided by a state machine that defines specific states for a terminal device. RRC states comprise a connected state such as RRC_CONNECTED of 3GPP specifications, an inactive state such as RRC_INACTIVE of 3GPP specifications and an idle state such as RRC_IDLE of 3GPP specifications. In different states a terminal device has different amounts of radio resources available. The terminal is further configured to switch from a first state to a second state in response to receiving a command from network.

According to an example embodiment, the apparatus 200 is configured to initiate a small data transmission (SDT) procedure. According to an example embodiment, the small data transmission comprises a small data transmission using uplink resources. In some examples, the uplink resources may comprise Random Access Channel (RACH) resources such as MSGA resources over 2-step RACH or Msg3 resources over 4-step RACH. In some examples, the uplink resources may comprise configured grant (CG) resources configured for the apparatus 200.

Initiating a small data transmission may comprise, for example, transmitting an indication of a small data transmission procedure to the RAN 250. The apparatus 200 may be configured to initiate the SDT procedure in response to receiving one or more data packets in a data buffer of the apparatus 200.

According to an example embodiment, the small data transmission procedure comprises transmitting data in an inactive state of the apparatus 200. For example, the apparatus 200 may be configured to perform an SDT procedure without state transition to a connected state such as RRC_CONNECTED of 3GPP specifications.

Without limiting the scope of the claims, an advantage of a small data transmission is that data may be transmitted in an inactive state of the apparatus thereby enabling reduced power consumption of the apparatus.

An SDT procedure may comprise a random access (RA) procedure for acquiring uplink synchronization and radio resource control (RRC) connection. An RA procedure may be initiated by a terminal device by sending a RACH signal to a RAN. The RACH signal may be referred to as a RACH preamble. A preamble corresponds to a specific physical random access channel (PRACH).

The RA procedure may comprise, for example, a contention based random access (CBRA) or a contention free random access (CFRA) of 3GPP specifications. An RA procedure associated with an SDT procedure may be referred to as a first random access procedure. When performing CBRA, the apparatus 200 is configured to randomly select a preamble from a pool of preambles shared with a plurality of terminal devices. In case the same preamble is selected by another device, the RAN 250 is configured to use a contention resolution mechanism to handle the contention. When performing CFRA, the apparatus 200 is configured to receive the preamble from the RAN 250 and therefore, there should not be a preamble conflict.

According to an example embodiment, the apparatus 200 is configured to receive information relating to a restriction to perform a random access procedure during the small data transmission procedure. The RA procedure may comprise an RA procedure different from an RA procedure associated with the SDT procedure and may be referred to as a second random access procedure. The second random access procedure may comprise, for example, an RA procedure subsequent to the first random access procedure.

The information relating to the restriction to perform a random access procedure may comprise an instruction, a parameter value and/or one or more criterion for applying the restriction.

According to an example embodiment, the information relating to the restriction to perform a random access procedure comprises an instruction to restrict initiation of the random access procedure. For example, the information relating to perform an RA procedure may comprise an instruction to restrict or prevent initiation of a second RA procedure.

According to an example embodiment, the information relating to the restriction to perform the random access procedure comprises information relating to timing of the restriction. For example, information relating to timing of the restriction may comprise a period of time, a specific time instance or a duration of the restriction. Information relating to timing of the restriction may comprise information indicating when the restriction is valid or invalid.

Timing of the restriction may comprise a defined start-time and a defined end-time or a defined start-time such that the end-time is defined based on a condition or a criterion.

According to an example embodiment, the information relating to the restriction to perform the random access procedure comprises a period of time for restricting initiation of the random access procedure. The period of time may comprise a period of time from a first time instance to a second time instance.

The period of time may relate to performing the random access procedure associated with the SDT procedure. For example, the period of time may comprise a period of time for performing the first random access procedure or a period of time for completing the first random access procedure.

As another example, the period of time may relate to performing the SDT procedure. For example, the period of time may comprise a specified period of time such as a duration of the SDT procedure or a period of time for completing the SDT procedure.

According to an example embodiment, the information relating to the restriction to perform the random access procedure comprises a time instance when the apparatus 200 is allowed to initiate the random access procedure.

According to an example embodiment, the information relating to the restriction to perform the random access procedure comprises a timer and a trigger condition for starting the timer. The apparatus 200 may be configured to apply the restriction to perform an RA procedure when the timer is activated and/or running. For example, the apparatus 200 may be configured to apply the restriction until the timer expires. For example, the apparatus 200 may be configured to apply the restriction to perform the RA procedure even if a buffer status report and subsequently a scheduling request (SR) is triggered upon new data arrival. According to an example embodiment, a scheduling request comprises a request for allocating uplink resources for transmitting one or more data packets.

According to an example embodiment, the trigger condition comprises at least one of the following: completion of contention resolution of a random access procedure associated with the small data transmission procedure, completion of the random access procedure associated with the small data transmission procedure, reception of an uplink grant, or transmission using an uplink grant.

According to an example embodiment, the timer is extended and/or adapted to support longer SDT sessions. Extending the timer may comprise, for example, multiplication or increasing the timer duration. The duration of the timer may be determined based on an amount of data in the buffer of the apparatus 200 and/or a number of SDT data radio bearers (DRBs) with data. The RAN 250 may be configured to estimate an approximate duration of the timer based on a BSR report. The timer may comprise, for example, T319 timer of 3GPP specifications.

The information relating to the restriction may be associated with information on how to apply the restriction. For example, the restriction may be associated with information defining one or more exceptions for applying the restriction.

According to an example embodiment, the information relating to the restriction to perform the random access procedure comprises at least one criterion for applying the restriction. The at least one criterion may comprise, for example, an exception relating to applying the restriction. For example, the at least one criterion may define that the restriction is not to be applied for a transmission other than the SDT procedure and/or for data comprising a predefined priority.

The apparatus 200 may be configured to receive the information relating to the restriction to perform a random access procedure from a radio access network such as the RAN 250.

According to an example embodiment, the apparatus 200 is configured to receive the information relating to the restriction to perform the random access procedure via a contention resolution message of the random access procedure associated with the small data transmission procedure.

A contention resolution message indicates to the apparatus 200 that the RAN 250 has successfully decoded SDT data received from the apparatus 200. The contention resolution message may comprise, for example, MsgB or Msg4 of Random Access procedure for 2-step RA or 4-step RA of 3GPP specifications, respectively.

A contention resolution message may comprise, for example, a dedicated physical random access channel (PRACH) preamble assignment to be used for contention free random access (CFRA) or a dedicated scheduling request (SR) resource to request an uplink grant when a BSR is triggered.

According to an example embodiment, the contention resolution message comprises an indication of a dedicated physical random access channel preamble to be used for contention free random access and the restricted random access procedure comprises a contention based random access procedure. The apparatus 200 may be configured to release the dedicated physical random access channel preamble upon termination of the timer.

According to an example embodiment, the dedicated physical random access channel preamble is valid in a synchronization signal block (SSB) where the small data transmission is performed. The SSB may sometimes be referred to as synchronization signal and physical broadcast channel (PBCH) block.

According to another example embodiment, the dedicated physical random access channel preamble is valid in at least one synchronization signal block indicated by the RAN 250.

According to an example embodiment, the contention resolution message comprises an indication of a dedicated scheduling request resource to request an uplink grant when a buffer status report is triggered.

According to an example embodiment, the dedicated scheduling request resource is valid in the synchronization signal block where the small data transmission is performed.

According to another example embodiment, the dedicated scheduling request resource is valid in at least one synchronization signal block indicated by the RAN 250.

According to another example embodiment, the apparatus 200 is configured to receive the information relating to the restriction to perform the random access procedure via system information of a radio access network such as RAN 250.

According to an example embodiment, the contention resolution message comprises an indication of a dedicated scheduling request resource to be used. The apparatus 200 may be configured to release the dedicated scheduling request resource upon termination of the timer.

According to an example embodiment, the apparatus 200 is configured to restrict the random access procedure based on the information relating to the restriction. Restricting the RA procedure based on the information relating to the restriction may comprise, for example, predicting the RA procedure during the SDT procedure.

As mentioned above, the information relating to the restriction may be associated with information on how to apply the restriction. For example, the restriction may be associated with information defining one or more exceptions for applying the restriction.

According to an example embodiment, the restriction may be applied in a specific synchronization signal block (SSB) where the small data transmission is performed. According to an example embodiment, the restriction is invalid in one or more SSBs other than the SSB where the small data transmission is performed. In some examples, the apparatus 200 may apply an availability condition for the SSB. In some examples, the availability condition may comprise a signal level and/or quality threshold, such as reference signal received power (RSRP), reference signal received quality (RSRQ), or Signal to Interference Noise Ratio (SINR) threshold.

According to an example embodiment, in response to determining by the apparatus 200 that the SSB where the small data transmission is performed is unavailable, the apparatus 200 may perform the second RA procedure. In some examples, the apparatus 200 may be configured to determine that the SSB is unavailable when the measured RSRP or RSRQ or SINR on the SSB is below an RSRP or RSRQ or SINR threshold value, respectively. According to an example embodiment, the apparatus 200 is configured to perform the small data transmission procedure using configured grant (CG) resources. In some examples, the CG resources comprise pre-configured physical uplink shared channel (PUSCH) resources which the apparatus 200 may use for the SDT procedure. In some examples, the CG resources for the SDT procedure may be valid on at least one SSB indicated by the RAN 250. In some examples, the CG resources for the SDT procedure may be valid in case the apparatus 200 has valid uplink synchronization to the RAN 250. In some examples, the uplink synchronization may be valid on at least one SSB indicated by the RAN 250. In some examples, the uplink synchronization may be valid on a SSB used when the apparatus 200 is put into inactive mode by the RAN 250.

Without limiting the scope of the claims, an advantage of restricting the random access procedure is that a terminal device may be provided with uplink resources for a subsequent small data transmission procedure before the terminal device initiates a random access procedure.

According to an example embodiment, the apparatus 200 is configured to enable initiating the random access procedure upon termination of the restriction to perform the random access procedure.

Without limiting the scope of the claims, an advantage of enabling initiating the random access procedure upon termination of the restriction is that uplink resources are available for a subsequent small data transmission procedure when the terminal device initiates a random access procedure.

Similarly to the apparatus 200, the RAN 250 includes a processor operatively connected to read from and write to a memory. The processor may also be configured to receive control signals received via an input interface and/or the processor may be configured to output control signals via an output interface. In an example embodiment the processor may be configured to convert the received control signals into appropriate commands for controlling functionalities of the apparatus.

The memory stores computer program instructions which when loaded into the processor control the operation of the RAN 250 as explained below. In other examples, the RAN 250 may comprise more than one memory or different kinds of storage devices.

According to an example embodiment, the RAN 250 is configured to receive an indication of a small data transmission procedure.

An indication of small data transmission procedure may comprise, for example, a message for initiating the first random access procedure. For example, an indication of a first random access procedure may comprise random access request such as Msg1 or MsgA of 3GPP specifications.

According to an example embodiment, the RAN 250 is configured to transmit, based on the indication, information relating to a restriction to perform a random access procedure during the small data transmission procedure. According to an example embodiment, the RAN 250 is configured to transmit the information relating to the restriction to perform a random access procedure to the apparatus 200.

According to an example embodiment, the RAN 250 is configured to transmit the information relating to the restriction to perform a random access procedure via contention resolution message of the random access procedure associated with the small data transmission procedure.

According to an example embodiment, the RAN 250 is configured to transmit the information relating to the restriction to perform a random access procedure via system information of the RAN 250.

According to an example embodiment, the information relating to the restriction to perform a random access procedure comprises an instruction to restrict initiation of the random access procedure. For example, the information relating to perform an RA procedure may comprise an instruction to restrict or prevent initiation of a second RA procedure.

According to an example embodiment, the information relating the restriction comprises at least one criterion for applying the restriction. The at least one criterion may comprise, for example, an exception relating to applying the restriction. For example, the at least one criterion may define that the restriction is not to be applied for a transmission other than the SDT procedure and/or for data comprising a predefined priority.

According to an example embodiment, the RAN 250 is configured to configure an uplink grant for the random access procedure concurrently with the small data transmission procedure.

According to an example embodiment, the apparatus 200 comprises means for performing the features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200.

According to an example embodiment, the apparatus 200 comprises means for initiating a small data transmission procedure, means for receiving information relating to a restriction to perform a random access procedure during the small data transmission procedure, and means for restricting the random access procedure based on the information relating to the restriction.

According to an example embodiment, the apparatus 200 may further comprise means for receiving the information relating to the restriction to perform the random access procedure via a contention resolution message of the random access procedure associated with the small data transmission procedure or via system information of the RAN 250 and/or means for enabling initiating the random access procedure upon termination of the restriction to perform the random access procedure.

According to an example embodiment, the RAN 250 comprises means for performing the features of the RAN 250, wherein the means for performing comprises at least one processor, at least one memory including computer program code, the at least one memory and the computer program code configured to, with the at least one processor, cause the performance of the RAN 250.

According to an example embodiment, the RAN 250 comprises means for receiving an indication of a small data transmission procedure and means for transmitting, based on the indication, information relating to a restriction to perform a random access procedure during the small data transmission procedure. The RAN may further comprise means for configuring an uplink grant for the random access procedure concurrently with the small data transmission procedure.

Figure 3:
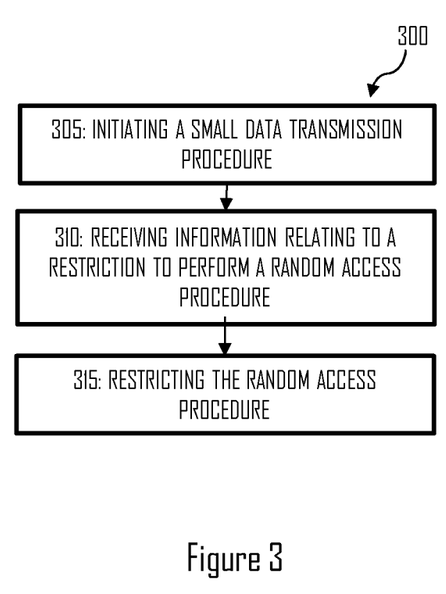
FIG. 3 illustrates an example method incorporating aspects of the examples of the invention.

FIG. 3 illustrates an example method 300 incorporating aspects of the previously disclosed elements. More specifically, the example method 300 illustrates restricting a random access procedure during a small data transmission procedure. The method 300 may be performed by the apparatus 200.

The method starts with initiating 305 a small data transmission procedure. The small data transmission procedure comprises transmitting data in an inactive state of the apparatus 200.

The method continues with receiving 310 information relating to a restriction to perform a random access procedure during the small data transmission procedure. The information relating to the restriction to perform a random access procedure may comprise an instruction, a parameter value and/or one or more criterion for applying the restriction.

The method further continues with restricting 315 the random access procedure based on the information relating to the restriction. Restricting the random access procedure based on the information relating to the restriction may comprise, for example, predicting the random access procedure during the small data transmission procedure.

Figure 4:
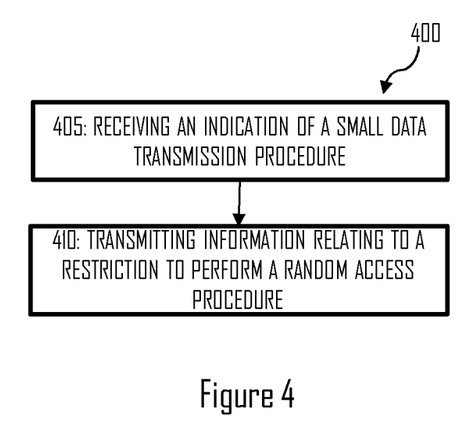
FIG. 4 illustrates another example method incorporating aspects of the examples of the invention.

FIG. 4 illustrates another example method 400 incorporating aspects of the previously disclosed elements. More specifically, the example method 400 illustrates restricting a random access procedure during a small data transmission procedure. The method 400 may be performed by the RAN 250.

The method starts with receiving 405 an indication of a small data transmission procedure. The indication of small data transmission procedure may comprise, for example, a message for initiating the first random access procedure. For example, an indication of a first random access procedure may comprise random access request such as Msg1 or MsgA of 3GPP specifications.

The method continues with transmitting 410, based on the indication, information relating to a restriction to perform a random access procedure during the small data transmission procedure. Transmit the information relating to the restriction to perform a random access procedure may comprise transmitting information via a contention resolution message of the random access procedure associated with the small data transmission procedure or via system information of the RAN 250.

Figure 5:
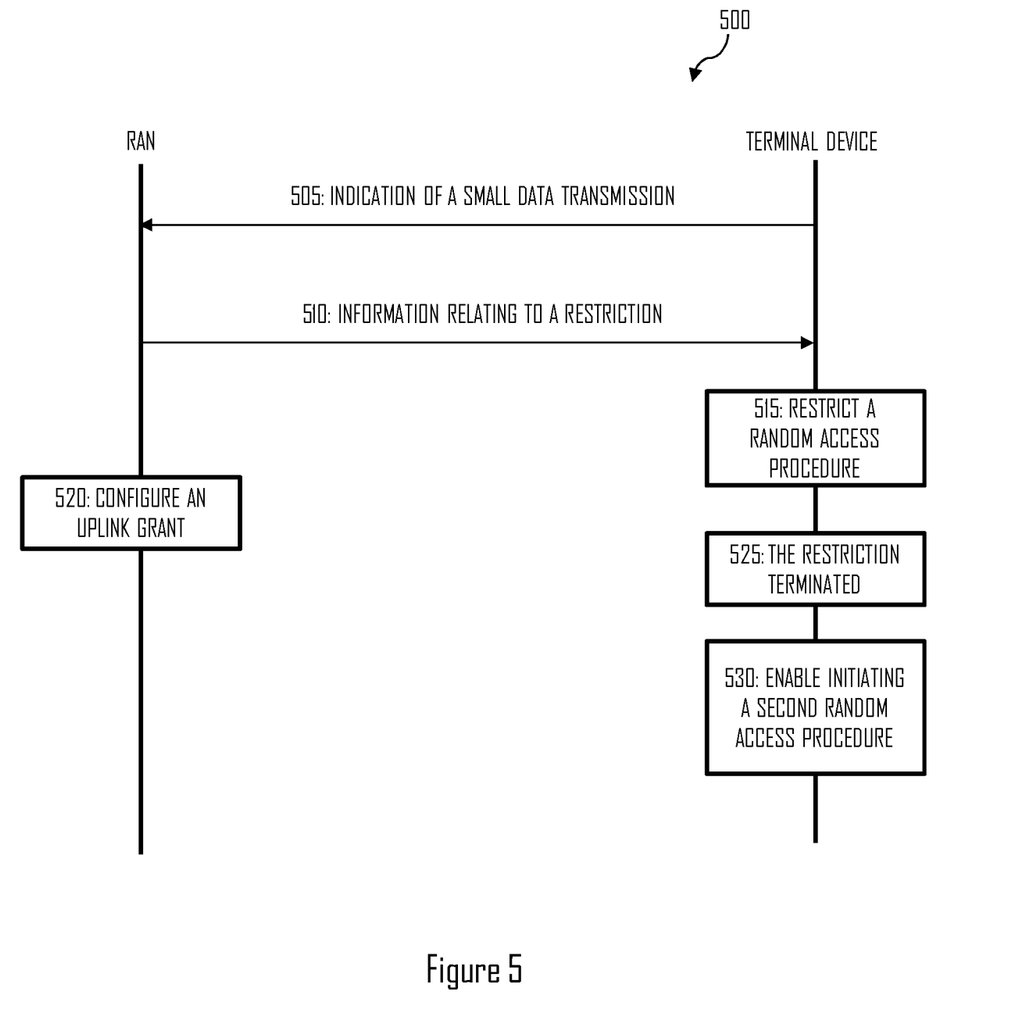
FIG. 5 illustrates an example signalling diagram incorporating aspects of the examples of the invention.

FIG. 5 illustrates an example signalling diagram incorporating aspects of the previously disclosed embodiments. In the example of FIG. 5, it is assumed that the apparatus 200 comprises a terminal device configured to communicate with the RAN 250.

In the example of FIG. 5, the terminal device sends 505 to the RAN an indication of a small data transmission procedure initiated by the terminal device. The small data transmission procedure comprises transmitting data in an inactive state of the terminal device. The terminal device may be configured to initiate the SDT procedure in response to receiving one or more data packets in a data buffer of the terminal device.

The RAN transmits 510, based on the indication, information relating to a restriction to perform a random access procedure during the small data transmission procedure. The RAN may transmit the information relating to the restriction to perform a random access procedure via contention resolution message of the random access procedure associated with the small data transmission procedure or via system information of the RAN.

The terminal devices restricts 515 the random access procedure based on the information relating to the restriction to perform a random access procedure during the small data transmission procedure and the RAN configures 520 an uplink grant for the random access procedure concurrently with the small data transmission procedure.

The terminal device enables 530 initiating the random access procedure upon termination of the restriction to perform the random access procedure.

Without limiting the scope of the claims, an advantage of restricting a subsequent random access procedure during a small data transmission is that the terminal device may be prevented from unnecessarily accessing a random access procedure for requesting uplink resources, for example, in case the RAN already has plans to provide the terminal device with new uplink resources for transmission.

Without in any way limiting the scope, interpretation, or application of the claims appearing below, a technical effect of one or more of the example embodiments disclosed herein is that a terminal device may be provided with uplink resources in a resource efficient manner for subsequent small data transmissions.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when it is not needed for operation.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

What is claimed is:

1. An apparatus comprising
at least one processor and at least one memory including computer program code, the at least one memory and the computer program code configured to with the at least one processor, cause the apparatus at least to:
transmit an indication of a small data transmission procedure;
receive, based on the indication, information relating to a restriction to perform a random access procedure during the small data transmission procedure, wherein the information relating to the restriction to perform the random access procedure comprises a timer and a trigger condition for starting the timer; and
restrict the random access procedure, during the small data transmission procedure, based on the timer and the trigger condition, wherein the timer is started in response to triggering of a buffer status report.

2. The apparatus according to claim 1, wherein the small data transmission procedure comprises transmitting data in an inactive state of the apparatus.

3. The apparatus according to claim 1, wherein the information relating to the restriction to perform the random access procedure comprises an instruction to restrict initiation of the random access procedure.

4. The apparatus according to claim 1, wherein the information relating to the restriction to perform the random access procedure comprises information relating to timing of the restriction.

5. The apparatus according to claim 4, wherein the information relating to the restriction to perform the random access procedure comprises a period of time for restricting initiation of the random access procedure.

6. The apparatus according to claim 4, wherein the information relating to the restriction to perform the random access procedure comprises a time instance when the apparatus is allowed to initiate the random access procedure.

7. The apparatus according to claim 1, wherein the trigger condition for starting the timer comprises at least one of the following: completion of contention resolution of a random access procedure associated with the small data transmission procedure, completion of the random access procedure associated with the small data transmission procedure, reception of an uplink grant, or transmission using an uplink grant.

8. The apparatus according to claim 1, wherein the information relating to the restriction to perform a random access procedure comprises at least one criterion for applying the restriction.

9. The apparatus according to claim 1, wherein the at least one memory and the computer program code are configured to with the at least one processor, cause the apparatus to receive the information relating to the restriction to perform a random access procedure via system information of a radio access network.

10. The apparatus according to claim 1, wherein the at least one memory and the computer program code are configured to with the at least one processor, cause the apparatus to enable initiating the random access procedure upon termination of the restriction to perform the random access procedure.

11. The apparatus according to claim 1, wherein the apparatus comprises a terminal device.

12. A method comprising:
    transmitting an indication of a small data transmission procedure;
    receiving, based on the indication, information relating to a restriction to perform a random access procedure during the small data transmission procedure, wherein the information relating to the restriction to perform the random access procedure comprises a timer and a trigger condition for starting the timer; and
    restricting the random access procedure, during the small data transmission procedure, based on the timer and the trigger condition, wherein the timer is started in response to triggering of a buffer status report.

13. An apparatus comprising at least one processor and at least one memory including computer program code, the at least one memory and the computer program code configured to with the at least one processor, cause the apparatus at least to:
    receive an indication of a small data transmission procedure; and
    transmit, based on the indication, information relating to a restriction to perform a random access procedure during the small data transmission procedure, wherein the information relating to the restriction to perform the random access procedure comprises a timer and a trigger condition for starting the timer during the small data transmission procedure, and wherein the timer is configured to start in response to triggering of a buffer status report.

14. The apparatus according to claim 13, wherein the at least one memory and the computer program code are configured to with the at least one processor, cause the apparatus to transmit the information relating to the restriction to perform a random access procedure via a contention resolution message of the random access procedure associated with the small data transmission procedure.

15. The apparatus according to claim 13, the at least one memory and the computer program code are configured to with the at least one processor, cause the apparatus to transmit the information relating to the restriction to perform a random access procedure via system information of the apparatus.

16. The apparatus according to claim 13, wherein the information relating to the restriction to perform a random access procedure comprises an instruction to restrict initiation of the random access procedure.

17. The apparatus according to claim 13, wherein the information relating to the restriction comprises at least one criterion for applying the restriction.

18. The apparatus according to claim 13, wherein the apparatus comprises a radio access network.

* * * * *